United States Patent [19]
Kohn et al.

[11] Patent Number: 5,264,537
[45] Date of Patent: Nov. 23, 1993

[54] POLYIMINOCARBONATE SYNTHESIS

[75] Inventors: Joachim B. Kohn, Highland Park; Chun Li, Piscataway, both of N.J.

[73] Assignee: Rutgers, The State University, Piscataway, N.J.

[21] Appl. No.: 846,603

[22] Filed: Mar. 5, 1992

Related U.S. Application Data

[62] Division of Ser. No. 553,224, Jul. 13, 1990, Pat. No. 5,140,094, which is a division of Ser. No. 219,290, Jul. 14, 1988, Pat. No. 4,980,449.

[51] Int. Cl.$^5$ .............................................. C08G 73/00
[52] U.S. Cl. ..................................... 528/211; 528/172; 528/174; 528/206; 528/207; 528/208
[58] Field of Search ............... 528/211, 172, 174, 206, 528/207, 208

[56] References Cited

U.S. PATENT DOCUMENTS

| | | | |
|---|---|---|---|
| 3,491,060 | 1/1970 | Schminke et al. | 528/211 |
| 5,140,094 | 8/1992 | Kohn et al. | 528/211 |

*Primary Examiner*—Harold D. Anderson
*Attorney, Agent, or Firm*—Lerner, David, Littenberg, Krumholz & Mentlik

[57] ABSTRACT

Novel polyiminocarbonates having molecular weights exceeding 70,000 daltons. Novel solution polymerization and interfacial polymerization processes for the preparation of polyiminocarbonates in which cyanate compounds are reacted with diphenol compounds in the presence of a strong base catalyst.

39 Claims, No Drawings

POLYIMINOCARBONATE SYNTHESIS

This is a division of application Ser. No. 07/553,224, filed Jul. 13, 1990, now U.S. Pat. No. 5,140,094 which is a divisional of application Ser. No. 07/219,290, filed on Jul. 14, 1988, which issued as U.S. Pat. No. 4,980,449 on Dec. 25, 1990.

BACKGROUND OF THE INVENTION

The present invention relates to organic polymers known as polyiminocarbonates and to methods of synthesizing such polymers.

Deficiencies in the mechanical, physical and toxicological properties of degradable plastic materials suggested for use as tissue compatible materials has lead to an international research effort directed towards development of degradable polymers for biomedical uses. Such degradable polymers also address the growing public concern about the accumulation of non-degradable plastic materials in the environment.

In the field of bio-medicine, Kohn et al., U.S. Pat. No. 4,638,045 describe the synthesis of non-peptide poly (amino acid) bioerodable polymers useful for controlled release applications such as delivery of a wide variety of biologically and pharmacologically active compounds. The polymers were prepared by polymerizing —L— amino acids or dipeptides by non-amide bonds, such as iminocarbonate bonds, located on the amino acid side chains.

Kohn et al., *Bio-materials*, 7, 176–182 (1986) further disclose the usefulness of polyiminocarbonates as potential bio-materials.

Polyiminocarbonates are structurally related to polycarbonates. The polyiminocarbonates have imino groups in the places normally occupied by carbonyl oxygen in the polycarbonates. Thus, the polyiminocarbonates have linkages according to the formula:

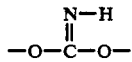

This imparts a significant degree of hydrolytic instability to the polymer. The polyiminocarbonates have desirable mechanical properties akin to those of the corresponding polycarbonates.

Compared to polycarbonates, little work has thus far been published on the synthesis of polyiminocarbonates. Hedayatullah, *Bulletin De La Societe Chemique De France*, 2, 416–421 (1967), in the first reported synthesis of a polyiminocarbonate, reacted aqueous solutions of various chlorinated diphenolate sodium salts with cyanogen bromide dissolved in methylene chloride. Hedayatullah only reported the melting points and elemental analysis of the obtained products, and it is not easy to determine with certainty to what extent truly polymeric materials were prepared. Later, Schminke et al., U.S. Pat. No. 3,491,060 reported that Hedayatullah's procedure yielded only oligomers with molecular weights below 5,000 daltons. The '060 patent describes synthesis of polyiminocarbonates by solution polymerization using an equimolar mixture of aromatic dicyanate and diphenol in solution. The '060 patent recites a broad range of solvents and catalysts, and asserts that the solution polymerization procedure provides "polymers with molecular weights up to about 60,000."

However, no method has been disclosed to date for the synthesis of polyiminocarbonates having molecular weights in excess of 60,000 daltons. Moreover, no method has been disclosed to date for synthesis of the dipeptide-based polyiminocarbonates as disclosed in the '045 patent having molecular weights in excess of 20,000 daltons. Higher molecular weight iminocarbonates are desired because higher molecular weight polymers generally provide better mechanical properties.

Thus, there have been unmet needs heretofore for improved methods of synthesizing polyiminocarbonates and for improved polyiminocarbonates.

SUMMARY OF THE INVENTION

The present invention addresses these needs.

One aspect of the present invention provides an improved solution polymerization process. A solution polymerization process according to this aspect of the invention includes the steps of contacting a diphenol with a dicyanate in solution in an essentially pure solvent in the presence of a catalyst selected from the group consisting of metal hydroxides, metal hydrides and metal alkoxides and recovering the resulting polyiminocarbonate. The solvent preferably is selected from the group consisting of acetone and tetrahydrofuran ("THF"). Most preferably, the solvent is freshly distilled THF. The catalyst preferably is an alkali metal hydroxide or alkoxide, such as sodium hydroxide or potassium tert-butoxide.

This aspect of the present invention incorporates the discovery that solvent purity, catalyst selection and solvent selection significantly affect the results obtained in the solution polymerization reaction. Thus, even nominally pure reagent-grade or analytical-grade solvents, and particularly THF, may contain residual water, stabilizers such as butylated hydroxy toluene and peroxides. According to this aspect of the present invention, it has been found that these contaminants, even in minor amounts, interfere with the solution polymerization reaction. Moreover, it has been found that among the broad class of catalysts suggested for solution polymerization synthesis of polyiminocarbonates, the metal hydroxides, metal alkoxides and metal hydrides, and particularly the alkali metal hydroxides and alkoxides, provide markedly superior results. Additionally, this aspect of the present invention incorporates the relatization that of all of the broad classes of solvents suggested heretofore for the polymerization reactions, THF and acetone, and particularly THF, provide superior results.

A further aspect of the present invention provides interfacial polymerization processes for production of polyiminocarbonates. An interfacial polymerization process according to a first mode includes the steps of admixing an aqueous solution of a diphenol and a basic catalyst with a solution of cyanogen bromide in a water-immiscible organic solvent by progressively adding the aqueous solution to said solution of syanogen bromide in organic solvent while mixing, and recovering the resulting polyiminocarbonate. This aspect incorporates the discovery that order of addition is highly significant, and that the rate of addition is also significant. Prior processes as taught by the aforementioned Hedayatullah article involved addition of the organic solution of cyanogen bromide to aqueous diphenol and catalyst solution. These by processes produced only low-molecular weight oligomers. By contrast, preferred processes according to this mode of the present invention can provide the desirable, high-molecular weight iminocarbonates utilizing economical starting materials—the diphenol and the cyanogen bromide. These is no need for the relatively expensive dicyanates as starting materials in processes according to this mode.

An interfacial polymerization process according to a second mode includes the steps of intimately admixing an aqueous solution of a diphenol and a basic catalyst such as a metal hydroxide with a solution of a dicyanate in a water-immiscible organic solvent and recovering the resulting polyiminocarbonate. An interfacial polymerization process utilizing a dicyanate, and particularly an aromatic dicyanate in conjunction with an aqueous phase would not appear particularly promising because of the extreme sensitivity of aromatic dicyanates toward hydrolysis by a strong aqueous base to a diphenolate. The strong base would be expected to compete with the diphenol for dicyanate, reducing the yield of the condensation reaction. This would be expected to produce low molecular weight condensation products. Surprisingly, it has been found that an interfacial polymerization utilizing an organic phase cyanate solution and an aqueous phase diphenol and catalyst solution can provide a high molecular weight polyiminocarbonate polymer typically about 70,000 M.W. or higher.

There is some hydrolysis of the dicyanate monomer in the process according to this mode. This results in the depletion of dicyanate and generation of diphenol. Thus some of the diphenol used during the process is formed in situ by hydrolysis of the dicyanate. Adjusting the ratio of total diphenol added to the reaction system as a starting material before or during the reaction to total dicyanate added to the system as a starting material before or during the reaction compensates for the hydrolysis. The rate of hydrolysis varies with the solvent used, therefore the appropriate ratio of reactants will also vary accordingly. For $CCl_4$ solvent, the molar ratio of total diphenol to total dicyanate is preferably between about 0.05:1 and about 1.00:1, and more preferably between about 0.60:1 and 0.90:1. A molar ratio of 0.83:1 is most preferred. For $CH_2Cl_2$ solvent the corresponding molar ratio is preferably between about 0.05:1 and about 1.10:1, and more preferably between about 0.80:1 and about 1.00:1. A molar ratio of about 1.00:1 is most preferred.

An interfacial polymerization process according to a third mode includes the steps of intimately admixing an aqueous solution of a basic catalyst such as a metal hydroxide with a solution of a dicyanate in a water-immiscible organic solvent and recovering the resulting polyiminocarbonate. In the interfacial polymerization method according to this mode, the dicyanate compounds described above are hydrolyzed by the catalyst to generate the diphenol for the process. Thus, no diphenol need be included in the aqueous phase as a starting material.

In interfacial polymerization according to any of the three modes, as discussed above, the reaction rate, yield, and product molecular weight can be significantly increased by adding a phase transfer catalyst (PTC) to the system, as by incorporating the PTC in the aqueous solution. PTC's are salt-like molecules that serve to transfer reactants between the aqueous and organic phases in an interfacial polymerization. The mechanisms by which PTC's function to transfer reactants, as well as numerous examples of PTC's suitable for the reaction system of the present invention are disclosed in the standard reference Phase Transfer Catalysis, and are well known to those skilled in the art of interfacial polymerization. Tetrabutyl ammonium bromide (TBAB), N-ethyl-4-dimethylamino pyridine are preferred PTC's. TBAB is a most preferred PTC. While TBAB solution concentration levels as high as about 50 mole percent are effective, the most marked increase in reaction rate, molecular weight and polymer yield occurs for TBAB concentrations up to about 5 mole percent. Significant improvement continues between about 5 mole percent and about 10 mole percent TBAB concentration. While reaction rate and polymer yield continues to increase beyond 10 mole percent TBAB concentration, the higher concentrations lead to a reduction of the molecular weight.

Preferred processes according to the above-mentioned aspects of the invention yield polyiminocarbonates of higher molecular weights than heretofore attainable. Thus, further aspects of the present invention provide polyiminocarbonates having molecular weights above 60,000 daltons, preferably above about 70,000 daltons, and desirably between about 100,000 and about 200,000 daltons. Yet another aspect of the present invention provides dipeptide-based polyiminocarbonates, having repeating units according to the structural formula:

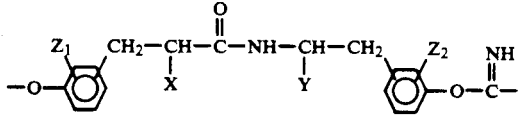

having a weight average molecular weight above about 20,000 daltons. The polyiminocarbonates according to this aspect of the present invention have molecular weights higher than those heretofore attainable in dipeptide-based polyiminocarbonates.

DETAILED DESCRIPTION OF THE PREFERRED EMBODIMENTS

In processes according to the present invention, diphenol compounds and/or dicyanate compounds are employed as starting materials.

Useful diphenol and dicyanate compounds include those disclosed in U.S. Pat. No. 3,491,060. Briefly, the dicyanates referred to in the '060 patent are of the formula $R(OCN)_2$ wherein R is an aromatic, araliphatic or heterocyclic radical. The disclosure of diphenol and dicyanate compounds useful to form polyiminocarbonates in said U.S. Pat. No. 3,491,060 is hereby incorporated by reference herein. Preferred dicyanates for use in the present invention have their —OCN groups attached to an aromatic ring system. Particularly preferred starting materials for use in processes according to the present invention are diphenol compounds with the formula

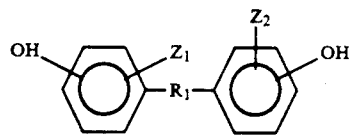

and dicyanate compounds with the formula

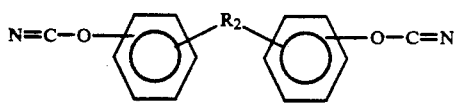

with $R_1$ and $R_2$ being the same or different and being alkyl, aryl, alkylaryl or a functional group containing heteroatoms. $Z_1$, $Z_2$, $Z_3$, and $Z_4$ may each represent one or more of the same or different radicals selected from the group consisting of hydrogen, halogen, lower-alkyl, carboxyl, amino, nitro, thioether, sulfoxide and sulfonyl. More preferably, all of $Z_1$, $Z_2$, $Z_3$ and $Z_4$ are hydrogen.

Even more preferred are diphenol and dicyanate compounds in which $R_1$ and $R_2$ are selected from the group consisting of:

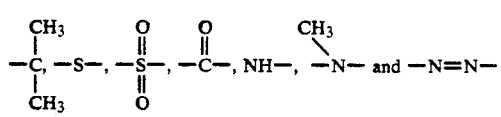

with the proviso that when $R_1$ is —N=N—, the diphenol compound is a meta-diphenol compound. Particularly preferred starting materials include Bisphenol A and Bisphenol A dicyanate.

Another class of particularly preferred starting materials are peptide derived diphenol and dicyanate compounds in which $R_1$ and $R_2$ are polyamino acids such as those disclosed in Kohn et al., U.S. Pat. No. 4,638,045. The disclosure of polyamino acids in said U.S. Pat. No. 4,138,045 is hereby incorporated by reference herein. Preferred peptide derived diphenol and dicyanate compounds include those in which $R_1$ and $R_2$ are the group

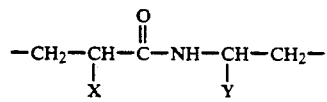

wherein X is

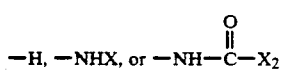

with $X_1$ being any one of the commonly used N-terminus protecting groups used in peptide synthesis including those disclosed in Bodanski, *Methods in Peptide Synthesis*, Springer Verlag, N. Y., 1983, and $X_2$ being a straight or branched alkyl chain; and Y=

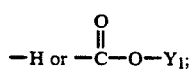

$Y_1$ being an alkyl, aryl, or alkylaryl radical, or any commonly used C-terminus protecting group as also disclosed by Bodanski. Preferred N-terminus protecting groups include

More preferable polyamino acid derived diphenol and dicyanate compounds include compounds in which $R_1$ and $R_2$ are

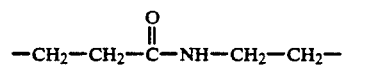

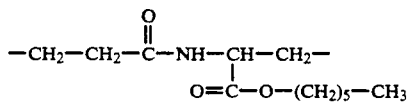

and

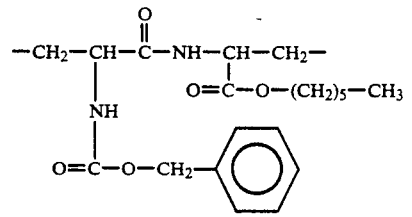

Preferred polyiminocarbonates of the present invention, formed by the polymerization reaction involving the preferred starting materials discussed above thus include one or more recurring structural units represented by the formula

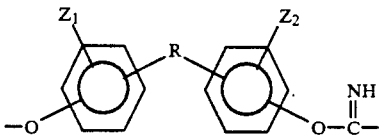

In this structural formula, $Z_1$ and $Z_2$ preferably are as discussed above with respect to $Z_1$ through $Z_4$ of the starting materials, and most preferably hydrogen. R preferably conforms to the description above with respect to $R_1$ and $R_2$.

SOLUTION POLYMERIZATION

In preparing the solution for polymerization, solvent purity is critical. The solvent used for the solution polymerization process should be essentially pure, i.e., free of any impurities which will adversely affect the polymerization reaction. In particular, the solvent should be free of water and peroxides. THF used in the process should be redistilled over sodium/benzophenone immediately prior to use. The reaction should be conducted in a vessel isolated from oxygen and water vapor. Desirably, the reaction vessel is purged with dry nitrogen or argon, and the freshly distilled solvent is added by syringe. Exactly equimolar quantities of diphenol and dicyanate should be used. The total solution concentration (w/v %) of both compounds combined typically is about 20% to about 50% such as about 44% depending on monomer solubility.

The strong base catalyst is preferably a metal alkoxide or a metal hydroxide. Preferred metal alkoxides include sodium ethoxide and potassium tert-butoxide.

Sodium hydroxide is a preferred metal hydroxide. Potassium tert-butoxide is a particularly preferred catalyst. When $R_1$ and $R_2 =$

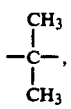

at 23° C., in the presence of up to 1.00 mole percent solution concentration of either potassium tert-butoxide or sodium hydroxide, over 99% of the dicyanate monomer is consumed within 4 hours. Increasing the reaction time beyond 4 hours has no beneficial effect and can actually result in a reduction of polymer molecular weight.

When $R_1$ and $R_2 =$

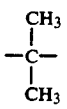

at 23° C., maximum molecular weight is obtained with either potassium tert-butoxide, or sodium hydroxide at a solution concentration of 0.20 mole percent. Concentrations of potassium tert-butoxide as low as 0.05 mole percent are effective but require longer reaction times and result in lower-molecular weight polymers. Concentrations of potassium tert-butoxide as high as 1.00 mole percent and sodium hydroxide as high as 1.50 mole percent are also effective and result in shorter reaction times, but also produce lower molecular weight polymers.

The reaction temperature should not exceed the range of thermal stability of the polyiminocarbonate, which, for $R_1$ and $R_2 =$

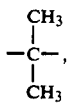

for example is about 140° C. The reaction temperature should be higher than the solution freezing point. A preferred reaction temperature range is between about 10° C. and about 78° C., the reflux temperature of THF. Most preferred is a reaction temperature of about room temperature, or about 20° to 30° C. By increasing reaction temperature, reaction time is shortened. The reaction typically goes substantially to completion with about 4 hours at about 20°-30° C. Desirably, the product polymer is recovered promptly after completion of the reaction.

Reaction time can also be shortened by increasing the catalyst concentration. This may be desirable when, due to the election withdrawing nature of particular groups $R_1$ and $R_2$, reaction rates decrease, lengthening the reaction time.

The catalyst should be added all at once to the diphenol-dicyanate solution with agitation. Because polyiminocarbonates are completely soluble in tetrahydrofuran (THF), a clear, viscous solution forms where the solvent is THF. The polymer is recovered by evaporating the solvent from this solution, and by washing as with excess acetone.

The solution polymerization process may also be conducted in acetone solvent. With an acetone solvent, the catalyst desirably is sodium hydroxide at a solution concentration between about 0.20 mole percent and about 1.50 mole percent or potassium tert-butoxide catalyst of a solution concentration between about 0.05 mole percent and about 1.00 mole percent.

The above mentioned diphenol and dicyanate compounds, including those specifically enumerated as preferred, are also useful in the acetone solvent based solution polymerization. The same total solution concentrations of diphenol and dicyanate may be used as with THF.

The reaction time in acetone solvent does not significantly vary from the reaction time in tetrahydrofuran, except that lower concentrations of potassium tert-butoxide in acetone result in a somewhat slower reaction time than the same concentrations in tetrahydrofuran.

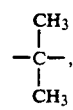

at 23° C., maximum molecular weight is obtained with potassium tert-butoxide at a solution concentration of 0.20 mole percent. For sodium hydroxide, the maximum molecular weight is obtained at a solution concentration of 1.00 mole percent. Lower and higher concentrations of catalysts also result in lower molecular weights with reactions times decreasing as catalyst is increased.

In acetone-based polymerizations the above reaction temperatures and preferred temperature ranges are used. Increasing the reaction temperature, the catalyst concentration, or both, may be used to counter any decrease in reaction rate and lengthening of reaction time caused by the election-withdrawing nature of particular groups $R_1$ and $R_2$.

The catalyst should be added to the diphenol-dicyanate acetone solution as described above. Polyiminocarbonates are not soluble in acetone and within minutes following the initiation of the addition of the catalysts, a polymer gel will start to separate from the reaction mixture. Upon termination of the reaction, the polymer can be separated by any convenient mechanical liquid/solid separation step such as filtration. The separated polymer can be purified by washing in excess acetone and drying.

INTERFACIAL POLYMERIZATION—FIRST MODE

An interfacial polymerization according to the first mode mentioned above utilizes an aqueous solution containing one or more the diphenol starting materials described above, including compounds specifically enumerated as preferred together with a metal hydroxide reaction catalyst. This aqueous solution is added slowly, with vigorous stirring into a solution of cyanogen bromide in a water-immiscible organic solvent. The cyanogen bromide reacts with the diphenol to produce dicyanate, which then reacts with the remaining diphenol to form polyiminocarbonates.

The concentration of cyanogen bromide in the organic phase typically is about 0.01 to about 0.05 g/ml, and desirably about 0.03 g/ml. The concentration of diphenol in the aqueous phase typically is about 0.05 to about 0.4 molar, and desirably about 0.2 molar. The ratio of cyanogen bromide to diphenol added as starting materials typically is about 1:1 to about 2:1, and desirably about 1.54:1. The molar ratio of metal hydroxide reaction catalyst to diphenol may be about 0.5:1 to about 2:1, and desirably about 1:1.

Desirably, the aqueous diphenol and catalyst solution also contains a phase transfer catalyst as aforementioned. The aqueous solution should be slowly added to the organic solution of cynogen bromide over a period of at least about 60 minutes and desirably about 120 minutes, with vigorous agitation. This agitation should be continued for at least about 60 minutes after the end of the addition, and desirably for at least about 120 minutes. Ordinarily, the polymer precipitates and is recovered by filtration and washing.

INTERFACIAL POLYMERIZATION—SECOND MODE

In an interfacial polymerization process according to a second mode, the aqueous phase includes a diphenol and the strong base catalyst. The organic phase includes a dicyanate starting material as discussed above, dissolved in a water immiscible solvent.

The aqueous solution of diphenol strong base reaction catalyst and a phase transfer catalyst typically is added progressively to dicyanate dissolved in water immiscible organic solvent. The progressive addition typically takes place over a period of about 10 minutes to about 60 minutes, and desirably about 20 minutes. As the aqueous solution is added, the two phases are intimately admixed to bring the diphenol and dicyanate and catalyst into reactive contact. This can be accomplished by vigorous mixing, such as by mechanical agitation or other conventional liquid-liquid contacting techniques. Upon thorough mixing of the two phases, a polyiminocarbonate precipitate forms. The precipitate may be separated by mechanical separation such as filtration and purified by solvent washing.

In preferred processes according to this second mode, the concentration of the diphenol in the aqueous phase may typically be between about 0.01 and about 1.0 molar, and most typically about 0.1 molar. The concentration of the dicyanate in the organic phase typically is between about 0.01 and about 1.0 molar, and most preferably about 0.1 molar.

Preferred basic reaction catalysts include the alkali metal hydroxides and particularly sodium hydroxide. In this polymerization mode, 2 moles of the hydroxide reaction catalyst desirably is present per mole of diphenol in the aqueous phase. As noted above, the aqueous phase preferably includes a phase transfer catalyst.

INTERFACIAL POLYMERIZATION—THIRD MODE

In an interfacial polymerization process according to a third mode, the aqueous phase includes a hydroxide reaction catalyst in water preferably together with the phase transfer catalyst. The organic phase includes the dicyanate. The catalyst is permitted to hydrolyze dicyanate to diphenol, which then reacts with the remaining dicyanate. The reaction conditions, including dicyanate concentration, addition times and the like can be similar to those discussed above in connection with the second mode of interfacial polymerization. Preferably, about 1 mole to about 2 moles of hydroxide reaction catalyst are provided in the aqueous phase for each mole of dicyanate in the organic phase.

The polycarbonates obtained form resins which can be worked-up by known methods commonly employed in the field of synthetic resins to produce a large variety of different articles with valuable physical and chemical properties. Where the articles to be made are to be used in medical applications, $Z_1$, $Z_2$, $Z_3$ and $Z_4$ in the above-described structural formulae desirably are all hydrogen. This can provide a polymer capable of being hydrolyzed into non-toxic degradation products. Articles made of such polymers are useful, inter alia, as biomedical prosthesis and implants.

The following examples illustrate the present invention and are not intended to limit the same. The examples use the following materials, solvents and measurement procedures.

MATERIALS

Bisphenol A (99% purity), potassium tert-butoxide, tetrabutyl ammonium bromide (TBAB), and cyanogen bromide are available from Aldrich Chemicals. These materials are used without further purification.

SOLVENTS

All solvents are HPLC grade. Acetone is dried over three (3) Angstrom molecular sieves. Tetrahydrofuran (THF) is freshly distilled from sodium benzophenone and transferred into the reaction vessel by syringe.

MEASUREMENTS

GPC data are obtained with a Perkin-Elmer HPLC/GPC system consisting of a Model 410 pump, Perkin-Elmer Model LC-235 Diode Array UV detector, a Waters Model 410 refractive index detector, and the Perkin-Elmer Model 3600 computerized data station. Two (2) PL-GEL GPC columns (300 mm×7.7 mm, particle size 5 micron, pore size $10^3$ Angstrom and $10^5$ Angstrom respectively) are placed in series and operated at a flow rate of 1.0 ml of THF/MIN at room temperature. Data are collected relative to polystyrene standards and the columns were calibrated by low angle light scattering measurements. The barbituric acid reaction is used for the quantitative determination of Bisphenol A dicyanate.

EXAMPLE 1

Bisphenol A dicyanate is prepared as follows:

A three-necked, 500 ml round bottom flask equipped with thermometer, overhead stirrer and dropping funnel is charged with a solution of 21.4 g cyanogen bromide dissolved in 100 ml acetone. The system is protected from moisture by a $CaCl_2$ drying tube and cooled to $-10°$ C. by means of an external acetone-dry ice cooling mixture. 20.5 g of bisphenol A and 20.2 g of triethylamine are dissolved in 150 ml acetone and placed in the dropping funnel. With vigorous stirring, the bisphenol A/triethylamine solution is added to the cyanogen bromide solution over a period of 20 minutes. Temperature is kept below $-5°$ C. Stirring is continued for an additional 40 minutes; then the reaction mixture is allowed to warm to $+10°$ C. After completion of the reaction, the dense precipitate of triethylamine hydrobromide is removed by Buchner filtration. To the clear, colorless filtrate, 500 ml of ice cold water is added slowly and with stirring over the course of 5 minutes. A dense, crystalline precipitate of crude bisphenol A dicyanate forms, which is collected on a Buchner funnel, washed with ice cold water, rapidly dried over phosphorous pentoxide in vacuo. Crude bisphenol A dicyanate is obtained as a white crystalline solid (21.5 g, 86% yield). The crude material is recrystallized three times from hexane (16 g crude/1). The re-crystallized material consisted of long needles, M.P.=82°-83° C.

EXAMPLE 2

A 44% (w/v) THF solution of an exactly stoichiometric mixture of bisphenol A (BPA) and BPA-dicyanate is prepared, followed by the addition of 1M potassium tert-butoxide sufficient to yield a solution concentration of 1.0 mole percent. The mixture is stirred at 23° C. and conversion of dicyanate is monitored spectrophotometrically by the Barbituric Acid reaction. The initially present dicyanate is 99% consumed after a reaction time of 2 hours. Crude product is obtained by evaporating the solvent. The product is carefully washed with excess acetone and dried in vacuo. Poly(BPA-iminocarbonate) is obtained having a weight average molecular weight of 81,100 daltons measured by GPC relative to polystyrene standards.

EXAMPLES 3 AND 4

Poly(BPA-iminocarbonate) is prepared as in Example 1, except that the solution concentrations of potassium tert-butoxide are 0.05 mole percent and 0.20 mole percent. The reaction time and molecular weight relative to the catalyst concentration are depicted in Table I.

TABLE I

| EXAMPLE | Catalyst Concentration | Reaction Time | Molecular Weight |
|---|---|---|---|
| 3 | 0.5% | 20 hours | 117,400 |
| 4 | 0.20% | 4 hours | 151,800 |

EXAMPLES 5-7

Poly(BPA-iminocarbonate) is prepared as in Example 1, except that the catalyst is sodium hydroxide varying in solution concentration from 0.20 mole percent to 1.50 mole percent. The reaction time and molecular weight relative to the catalyst concentration are depicted in Table II.

TABLE II

| EXAMPLE | Catalyst Concentration | Reaction Time | Molecular Weight |
|---|---|---|---|
| 5 | 0.20% | 20 hours | 65,800 |
| 6 | 1.00% | 4 hours | 55,800 |
| 7 | 1.50% | 2 hours | 52,900 |

EXAMPLES 8-13

Poly(BPA-iminocarbonate) is prepared as in Example 1, except that the solvent is acetone. The catalysts are sodium hydroxide varying in solution concentration from 0.20 mole percent to 1.50 mole percent and potassium tert-butoxide varying in solution concentration from 0.05 mole percent to 1.00 mole percent. The reaction time and molecular weights relative to catalyst and catalyst concentration are depicted in Table III.

TABLE III

| EXAMPLE | Catalyst Concentration | Reaction Time | Molecular Weight |
|---|---|---|---|
| 8 | 0.05% K+oBu | 48 hours | 71,600 |
| 9 | 0.20% K+oBu | 4 hours | 85,900 |
| 10 | 1.00% K+oBu | 2 hours | 72,200 |
| 11 | 0.20% NaOH | 20 hours | 71,000 |
| 12 | 1.00% NaOH | 4 hours | 74,760 |
| 13 | 1.50% NaOH | 2 hours | 64,700 |

EXAMPLE 14

Poly(BPA-iminocarbonate) is synthesized by interfacial polymerization in a 250 ml 3-necked flask equipped with an overhead stirrer. 1.03 g BPA (4.5 mmol) is dissolved in 45 ml 0.2N sodium hydroxide. TBAB sufficient to yield a 10 mole percent solution concentration is added. 4.5 mmol BPA dicyanate is dissolved in 45 ml CCl4. The organic phase is transferred to a reaction vessel and vigorously mixed by an overhead stirrer operating at 2,000 rpm at 23° C. and the aqueous phase is slowly added over a period of 20 minutes. Mixing is continued until the initially present dicyanate is 99% consumed. The polymer is precipitated and collected on a Buchner funnel. The crude polymer is purified by redissolving in methylene chloride, followed by washings of the methylene chloride solution with water, drying of the methylene chloride solution over magnesium sulphate and evaporation to dryness. The purified polymer is a transparent, tough film. Poly(BPA-iminocarbonate) is obtained having a weight average molecular weight of 87,400 daltons. M.P.=175° C.-185° C.

EXAMPLES 15-27

Poly(BPA-iminocarbonate) is synthesized by interfacial polymerization as in Example 14, except that the ratio of BPA/BPA dicyanate is varied from 0:1 to 1:1. Methylene chloride is also used as the solvent in Examples 22-27. The molecular weights and polymer yields relative to solvent and monomer ratios are depicted in Table IV. Noteworthy is the fact that poly(BPA-iminocarbonate) is obtained in Examples 15 and 22 without using BPA, indicating that BPA for the synthesis is obtained solely from the hydrolysis of BPA dicyanate.

TABLE IV

| EXAMPLE | Solvent | Ratio | $M_w$ | Yield % |
|---|---|---|---|---|
| 15 | CCl4 | 0 | 84,200 | 72 |
| 16 | CCl4 | 0.10 | 86,500 | 72 |
| 17 | CCl4 | 0.50 | 87,960 | 86 |
| 18 | CCl4 | 0.67 | 107,600 | 77 |
| 19 | CCl4 | 0.83 | 192,500 | 98 |
| 20 | CCl4 | 0.91 | 171,800 | 79 |
| 21 | CCl4 | 1.00 | 87,400 | 92 |
| 22 | $CH_2Cl_2$ | 0 | 20,300 | 62 |
| 23 | $CH_2Cl_2$ | 0.50 | 37,745 | 69 |
| 24 | $CH_2Cl_2$ | 0.83 | 51,845 | 75 |
| 25 | $CH_2Cl_2$ | 0.91 | 55,460 | 69 |
| 26 | $CH_2Cl_2$ | 1.00 | 56,500 | 86 |
| 27 | $CH_2Cl_2$ | 1.10 | 41,130 | 70 |

EXAMPLES 28-42

Poly(BPA-iminocarbonate) is synthesized by interfacial polymerization as in Example 14, except that the solution concentration of TBAB is varied from 0 to 50 mole %. CCl4 is the solvent in Examples 28-32, toluene is the solvent in Examples 33-37, and $CH_2Cl_2$ is the solvent in Examples 38-42. The reaction time, molecular weights and polymer yields relative to solvent and TBAB concentration are depicted in Table V.

TABLE V

| EXAMPLE | Solvent | TBAB % | Time | Ma | Yield % |
|---|---|---|---|---|---|
| 28 | CCl4 | 0 | 93 Min. | 27,800 | 22 |
| 29 | CCl4 | 5 | 26 | 63,000 | 68 |
| 30 | CCl4 | 10 | 21 | 87,400 | 92 |
| 31 | CCl4 | 20 | 20 | 65,800 | 98 |
| 32 | CCl4 | 50 | 17 | 58,200 | 92 |
| 33 | Toluene | 0 | 600 | 69,000 | 29 |
| 34 | Toluene | 5 | 160 | 97,100 | 52 |
| 35 | Toluene | 10 | 100 | 62,300 | 60 |
| 36 | Toluene | 20 | 70 | 59,100 | 56 |
| 37 | Toluene | 50 | 65 | 28,100 | 80 |
| 38 | CH2Cl2 | 0 | 260 | 41,900 | 72 |
| 39 | CH2Cl2 | 5 | 10 | 53,100 | 94 |
| 40 | CH2Cl2 | 10 | 5 | 56,500 | 86 |
| 41 | CH2Cl2 | 20 | 1-2 | 45,400 | 78 |
| 42 | CH2Cl2 | 50 | 1 | 24,800 | 81 |

EXAMPLE 43

Poly(BPA-iminocarbonate) is synthesized by interfacial polymerization in a 250 ml 3-necked flask equipped with an overhead stirrer and a dropping funnel. 1.43 g cyanogen bromide (13.9 mmol) is dissolved in 45 ml CCl4 and placed in the flask. With vigorous stirring (2,000 rpm) a solution of 2.05 g BPA (9 mmol) in 45 ml 0.2N NaOH containing 10 mole percent of TBAB is dropped into the flask over a period of 120 minutes. Thereafter, stirring is continued for an additional 120 minutes. A white precipitate forms, which is collected and washed with water. The polymer is further purified as in the previous examples. Yield=32%, M.P.=130°-145° C., $M_w$=64,500 daltons.

The foregoing description and examples should be understood by one of illustration rather than by one of limitation of the present invention as defined in the claims. As will be appreciated, numerous variations and combinations of the features set forth within the foregoing description and examples can be utilized without departing from the present invention.

What is claimed is:

1. An interfacial polymerization process for making a polyiminocarbonate comprising the steps of intimately admixing an aqueous solution of a diphenol and a basic catalyst with a solution of a dicyanate in a water-immiscible organic solvent and recovering the resulting polyiminocarbonate.

2. A process as claimed in claim 1 wherein said step of intimately admixing includes the step of adding said aqueous solution to said solution of dicyanate in organic solvent while mixing.

3. A process as claimed in claim 2 wherein said adding is performed progressively over a period of between about 10 minutes and about 60 minutes.

4. The process of claim 1, wherein the solvent is CCl4, and the molar ratio of the diphenol compound in the aqueous solution to the dicyanate compound in the organic solution is between about 0.05:1 and about 1.00:1.

5. The process of claim 4 wherein said molar ratio is between about 0.60:1 and about 0.90:1.

6. The process of claim 5 wherein said molar ratio is about 0.83:1.

7. The process of claim 1, wherein the solvent is CH2Cl2, and molar ratio of the diphenol compound in the aqueous solution to the dicyanate compound in the organic solution is between about 0.05:1 and about 1.10:1.

8. The process of claim 7, wherein said molar ratio is about 0.80:1 and about 1.00:1.

9. The process of claim 8, wherein said molar ratio is about 1.00:1.

10. An interfacial polymerization process for making a polyiminocarbonate comprising the steps of intimately admixing an aqueous solution of a hydroxide reaction catalyst with a solution of an aromatic dicyanate in a water-immiscible organic solvent and recovering the resulting polyiminocarbonate.

11. The process of claims 1 or 10, wherein said dicyanate compound is a compound with the formula

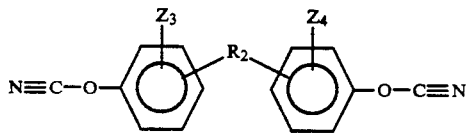

wherein $R_2$ is an alkylene, arylene, alkylaryl or a functional group containing heteroatoms and $Z_3$ and $Z_4$ are independently selected from the group consisting of hydrogen, halogen, alkyl, carboxyl, nitro, thioether, mercapto, alkyl sulfides, sulfinic acid, alkyl sulfoxides, sulfonic acid and alkyl sulfones.

12. The process of claim 11, wherein $R_2$ is selected from the group consisting of

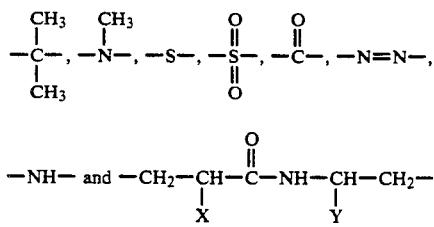

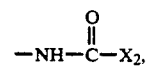

wherein X is selected from the group consisting of —H, —NHX1 and

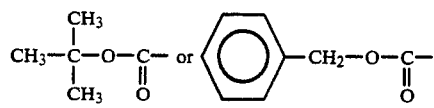

where X1 is

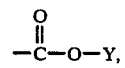

and $X_2$ is a straight or branched alkyl radical and Y is selected from the group consisting of —H and

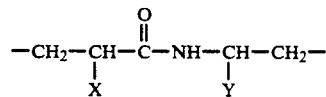

wherein $Y_1$ is an arylene, alkylene or alkylaryl radical.

13. The process of claim 12, wherein $R_2$ is $$-CH_2-CH(X)-C(=O)-NH-CH(Y)-CH_2-$$

X is selected from the group consisting of —H, —NHX$_1$ and

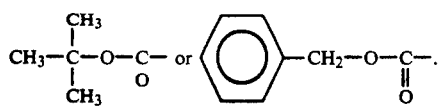

where X$_1$ is

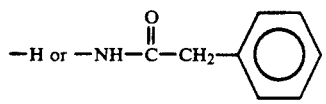

14. The process of claim 13, wherein X is

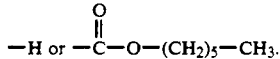

and Y is

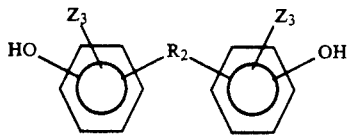

15. The process of claim 11, wherein Z$_3$ and Z$_4$ are both hydrogen.

16. The process of claim 1, where said diphenol compound is a compound with the formula

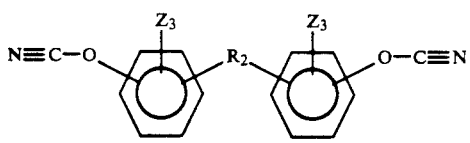

and said dicyanate compound is a compound with the formula

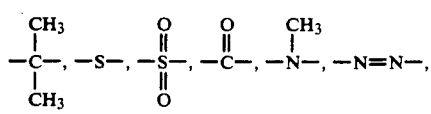

wherein R$_1$ and R$_2$ are independently selected from the group consisting of alkylene, arylene, alkylaryl functional groups and functional groups containing heteroatoms and Z$_1$, Z$_2$, Z$_3$ and Z$_4$ are independently selected from the group consisting of hydrogen, halogen, alkyl, carboxyl, nitro, thioether, mercapto, alkyl sulfides, sulfinic acid, alkyl sulfoxides, sulfonic acid and alkyl sulfones.

17. The process of claim 16, wherein R$_1$ and R$_2$ are the same or different and are selected from the group consisting of

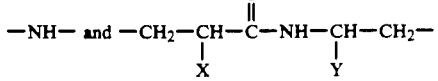

-continued

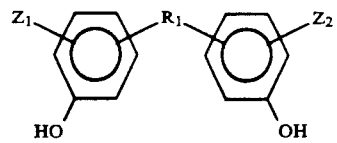

with the proviso that when R$_1$ is —N=N—, said diphenol is

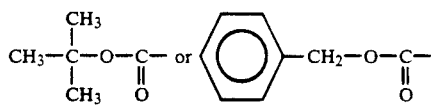

wherein X is selected from the group consisting of —H, —NHX$_1$, and

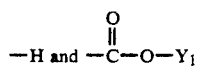

where X$_1$ is

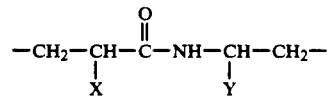

and X$_2$ is a straight or branched alkyl radical and Y is selected from the group consisting of

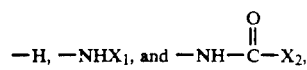

wherein Y$_1$ is an aryl, alkyl or alkylaryl radical.

18. The process of claim 17, wherein R$_1$ or R$_2$ is

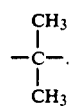

19. The process of claim 18, wherein R$_1$ and R$_2$ are

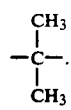

20. The process of claim 16, wherein Z$_1$, Z$_2$, Z$_3$ and Z$_4$ are hydrogen.

21. The process of claim 17, wherein R$_1$ or R$_2$ is

—CH$_2$—CH—C(=O)—NH—CH—CH$_2$—
         |                    |
         X                    Y where X is selected from the group consisting of —H, —NHX$_1$, and —NH—C(=O)—X$_2$, where X$_1$ is

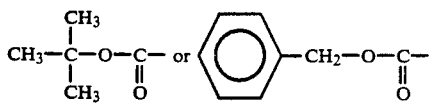

and X₂ is a straight or branched alkyl radical and Y is selected from the group consisting of

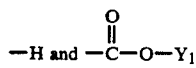

wherein Y₁ is an aryl, alkyl or alkylaryl radical.

22. The process of claim 21, wherein R₁ is

23. The process of claim 21, wherein R₂ is

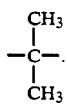

24. The process of claim 21, wherein X is —H or

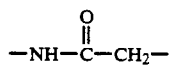

and Y is

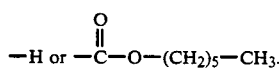

25. A process as claimed in claim 1 or 10 wherein said aqueous solution comprises a phase transfer catalyst.

26. The process of claim 25, wherein said phase transfer catalyst is selected from the group consisting of tetrabutyl ammonium bromide, N-ethyl-4-dimethylamino pyridine and benzyl triethylammonium chloride.

27. The process of claim 26, wherein the phase transfer catalyst is tetrabutyl ammonium bromide.

28. The process of claim 27, wherein the tetrabutyl ammonium bromide concentration in said aqueous solution is between about 0.50 mole percent and 50.00 mole percent.

29. The process of claim 28, wherein the tetrabutyl ammonium bromide concentration in said aqueous solution is between about 5.00 mole percent and 10.00 mole percent.

30. The process of claim 29, wherein the tetrabutyl ammonium bromide concentration is about 5.00 mole percent.

31. The process of claim 1 or 10, wherein the organic solvent is selected from the group consisting of CCl₄, CH₂Cl₂ and toluene.

32. The process of claim 1 or 10, wherein the basic catalyst is a metal hydroxide.

33. The process of claim 32, wherein the metal hydroxide is sodium hydroxide.

34. The process of claim 1, wherein said diphenol compound is a compound with the formula

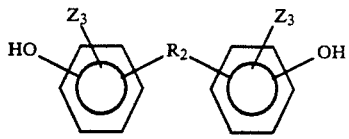

wherein R₁ is an alkylene, arylene, alkylaryl or a functional group containing heteroatoms and Z₁ and Z₂ are independently selected from the group consisting of hydrogen, halogen, alkyl, carboxyl, nitro, thioether, mercapto, alkyl sulfides, sulfinic acid, alkyl sulfoxides, sulfonic acid and alkyl sulfones.

35. The process of claim 34, wherein R₁ is selected from the group consisting of

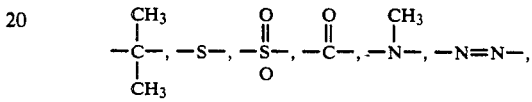

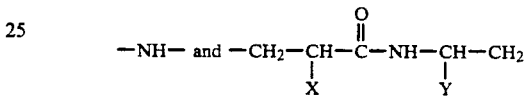

with the proviso that when R₁ is —N=N—, said diphenol is

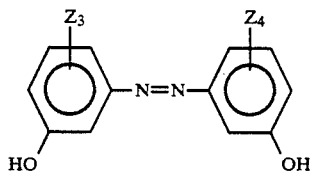

and wherein X is selected from the group consisting of —H, —HX₁ and

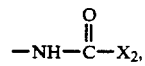

wherein X₁ is

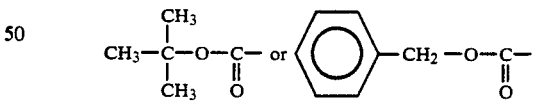

and X₂ is a straight or branched alkylene radical and Y is selected from the group consisting of —H and

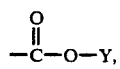

wherein Y₁ is an arylene, alkylene or alkylaryl radical.

36. The process of claim 35, wherein R₁ is

37. The process of claim 35, wherein $R_1$ is
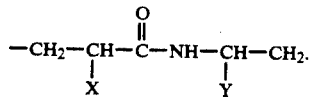
38. The process of claim 37, wherein X is —H or
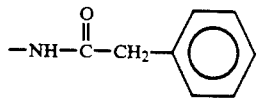
and Y is —H or
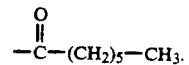
39. The process of claim 34, wherein $Z_1$ and $Z_2$ are both hydrogen.
* * * * *

UNITED STATES PATENT AND TRADEMARK OFFICE
CERTIFICATE OF CORRECTION

PATENT NO. : 5,264,537

DATED : November 23, 1993

INVENTOR(S) : Kohn et al.

It is certified that error appears in the above-identified patent and that said Letters Patent is hereby corrected as shown below:

Column 2, line 57, "syanogen" should read --cyanogen--.

Column 5, lines 21-25,

Column 6, lines 1-5,

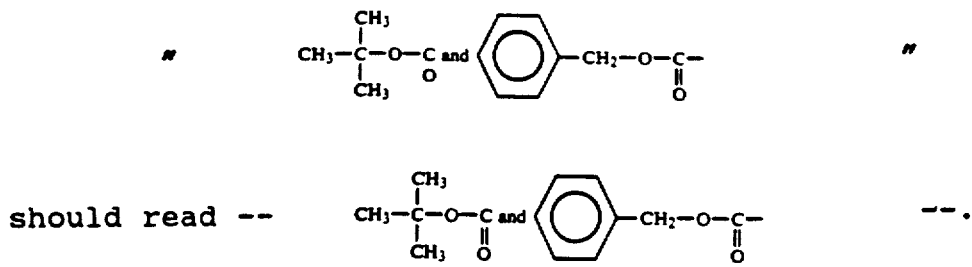

UNITED STATES PATENT AND TRADEMARK OFFICE
CERTIFICATE OF CORRECTION

PATENT NO. : 5,264,537

DATED : November 23, 1993

INVENTOR(S) : Kohn et al.

It is certified that error appears in the above-identified patent and that said Letters Patent is hereby corrected as shown below:

Column 8, lines 16-23, after "in tetrahydrofuran." and before the formula:

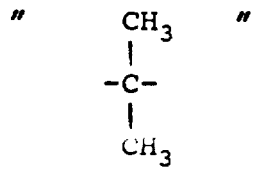

insert as a new paragraph --For $R_1$ and $R_2$ = --.

Column 8, line 54, "one or more the diphenol" should read --one or more of the diphenol--.

UNITED STATES PATENT AND TRADEMARK OFFICE
CERTIFICATE OF CORRECTION

PATENT NO. : 5,264,537
DATED : November 23, 1993
INVENTOR(S) : Kohn et al.

It is certified that error appears in the above-identified patent and that said Letters Patent is hereby corrected as shown below:

Column 15, lines 11-15, within claim 13,

"  "

should read

--  --

UNITED STATES PATENT AND TRADEMARK OFFICE
CERTIFICATE OF CORRECTION

PATENT NO. : 5,264,537
DATED : November 23, 1993
INVENTOR(S) : Kohn et al.

It is certified that error appears in the above-identified patent and that said Letters Patent is hereby corrected as shown below:

Column 18, lines 20-24, within claim 34,

"  "

should read

-- 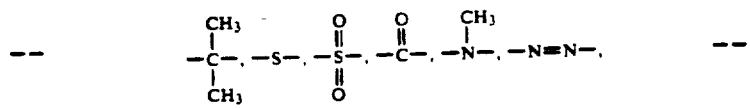 --

Signed and Sealed this

Fourteenth Day of June, 1994

Attest:

BRUCE LEHMAN

Attesting Officer     Commissioner of Patents and Trademarks